US008666814B2

(12) United States Patent
Ko

(10) Patent No.: US 8,666,814 B2
(45) Date of Patent: Mar. 4, 2014

(54) ADVERTISING METHOD AND SYSTEM ADAPTIVE TO DATA BROADCAST

(75) Inventor: Jong Ok Ko, Guro-gu (KR)

(73) Assignee: Fobikr Co., Ltd., Incheon (KR)

( * ) Notice: Subject to any disclaimer, the term of this patent is extended or adjusted under 35 U.S.C. 154(b) by 244 days.

(21) Appl. No.: 13/057,554

(22) PCT Filed: Aug. 4, 2009

(86) PCT No.: PCT/KR2009/004345
§ 371 (c)(1),
(2), (4) Date: Feb. 4, 2011

(87) PCT Pub. No.: WO2010/016710
PCT Pub. Date: Feb. 11, 2010

(65) Prior Publication Data
US 2011/0137731 A1 Jun. 9, 2011

(30) Foreign Application Priority Data
Aug. 7, 2008 (KR) .................. 10-2008-0077220

(51) Int. Cl.
*G06Q 30/00* (2012.01)
(52) U.S. Cl.
USPC .................. 705/14.58; 705/14.53; 705/14.64
(58) Field of Classification Search
USPC ................... 705/14.58, 14.64, 14.53
See application file for complete search history.

(56) References Cited

U.S. PATENT DOCUMENTS

| 6,549,625 | B1 * | 4/2003 | Rautila et al. .................. 380/258 |
| 7,306,522 | B2 * | 12/2007 | Silver et al. ..................... 463/41 |
| 7,590,997 | B2 * | 9/2009 | Diaz Perez .................... 725/109 |
| 7,634,788 | B2 * | 12/2009 | Gordon et al. .................. 725/41 |
| 7,774,819 | B2 * | 8/2010 | Perez ............................. 725/109 |
| 7,962,942 | B1 * | 6/2011 | Craner ............................ 725/88 |
| 7,979,899 | B2 * | 7/2011 | Guo et al. ........................ 726/7 |
| 7,987,491 | B2 * | 7/2011 | Reisman ....................... 725/112 |
| 8,095,400 | B2 * | 1/2012 | Herde et al. ..................... 705/5 |

(Continued)

FOREIGN PATENT DOCUMENTS

| KR | 10-2003-0083968 | 11/2003 |
| KR | 10-2007-0090441 | 9/2007 |
| KR | 10-2008-0072343 | 8/2008 |

OTHER PUBLICATIONS

Ji-Seong, Kim; KR2008072343MT; Application #10-2006-0020156; Service Apparatus for VOD content and advertisement matching therewith; filed: Mar. 2, 2006; Published (KR) Sep. 8, 2007; English Translation.*

(Continued)

*Primary Examiner* — John G Weiss
*Assistant Examiner* — Adam Chornesky
(74) *Attorney, Agent, or Firm* — Harness, Dickey & Pierce, P.L.C.

(57) ABSTRACT

There is provided an advertising method comprising receiving a broadcast request signal from a video on demand (VOD) terminal to download data broadcast; receiving an advertisement request signal from a mobile communication terminal to download advertising broadcast including information on goods related to contents of the data broadcast; synchronizing the data broadcast with the advertising broadcast in such a way that an advertising broadcast scene corresponding to the data broadcast is displayed on the mobile communication terminal while replaying the data broadcast on the VOD terminal; sending the data broadcast to the VOD terminal; and sending the advertising broadcast to the mobile communication terminal.

14 Claims, 2 Drawing Sheets

(56) References Cited

U.S. PATENT DOCUMENTS

| | | | |
|---|---|---|---|
| 8,194,646 B2 * | 6/2012 | Elliott et al. | 370/352 |
| 2003/0005439 A1 * | 1/2003 | Rovira | 725/37 |
| 2003/0093790 A1 * | 5/2003 | Logan et al. | 725/38 |
| 2003/0149975 A1 * | 8/2003 | Eldering et al. | 725/34 |
| 2003/0229900 A1 * | 12/2003 | Reisman | 725/87 |
| 2004/0031058 A1 * | 2/2004 | Reisman | 725/112 |
| 2004/0148638 A1 * | 7/2004 | Weisman et al. | 725/115 |
| 2005/0229227 A1 * | 10/2005 | Rogers | 725/115 |
| 2006/0068861 A1 * | 3/2006 | Triestram et al. | 463/1 |
| 2007/0005795 A1 * | 1/2007 | Gonzalez | 709/232 |
| 2007/0011702 A1 * | 1/2007 | Vaysman | 725/45 |
| 2007/0089150 A1 * | 4/2007 | Bowler | 725/113 |
| 2008/0059631 A1 * | 3/2008 | Bergstrom et al. | 709/224 |
| 2008/0244681 A1 * | 10/2008 | Gossweiler et al. | 725/133 |
| 2009/0063279 A1 * | 3/2009 | Ives et al. | 705/14 |
| 2009/0210899 A1 * | 8/2009 | Lawrence-Apfelbaum et al. | 725/34 |
| 2009/0222335 A1 * | 9/2009 | Gopal et al. | 705/14 |
| 2009/0248828 A1 * | 10/2009 | Gould et al. | 709/207 |
| 2009/0307092 A1 * | 12/2009 | Gugliuzza et al. | 705/14.64 |
| 2010/0023965 A1 * | 1/2010 | Malik | 725/32 |
| 2010/0031193 A1 * | 2/2010 | Stark et al. | 715/810 |
| 2010/0107190 A1 * | 4/2010 | Lee et al. | 725/32 |
| 2010/0146533 A1 * | 6/2010 | Matsunaga et al. | 725/22 |
| 2010/0153831 A1 * | 6/2010 | Beaton | 715/201 |
| 2010/0162367 A1 * | 6/2010 | LaJoie et al. | 726/4 |
| 2010/0242079 A1 * | 9/2010 | Riedl et al. | 725/115 |
| 2010/0262486 A1 * | 10/2010 | Matsunaga et al. | 705/14.43 |
| 2010/0312646 A1 * | 12/2010 | Gupta et al. | 705/14.58 |
| 2011/0035270 A1 * | 2/2011 | Matsunaga et al. | 705/14.41 |
| 2011/0041153 A1 * | 2/2011 | Simon et al. | 725/46 |
| 2011/0082766 A1 * | 4/2011 | Ko | 705/26.9 |
| 2011/0137731 A1 * | 6/2011 | Ko | 705/14.58 |
| 2011/0246290 A1 * | 10/2011 | Howard et al. | 705/14.49 |
| 2011/0286721 A1 * | 11/2011 | Craner | 386/343 |
| 2012/0022943 A1 * | 1/2012 | Howard et al. | 705/14.51 |

OTHER PUBLICATIONS

Ji-Seong, Kim; KR2007090441MT; Application #10-2006-0020156; Service Apparatus for VOD contents and advertisements matching therewith; filed: Mar. 2, 2006; published (KR) Sep. 6, 2007; English Translation.*

Hyeong-Jik, Lee; KR2003083968MT; Application #10-2002-0022412; Home-Shopping System and Method using Homeserver and Personal Communicator; filed: Feb. 24, 2002; published (KR) Nov. 1, 2003; English Translation.*

International Search Report (ISR) and Written Opinion (WO) in PCT/KR2009/004345 dated Mar. 24, 2010 and an English Translation of ISR.

* cited by examiner

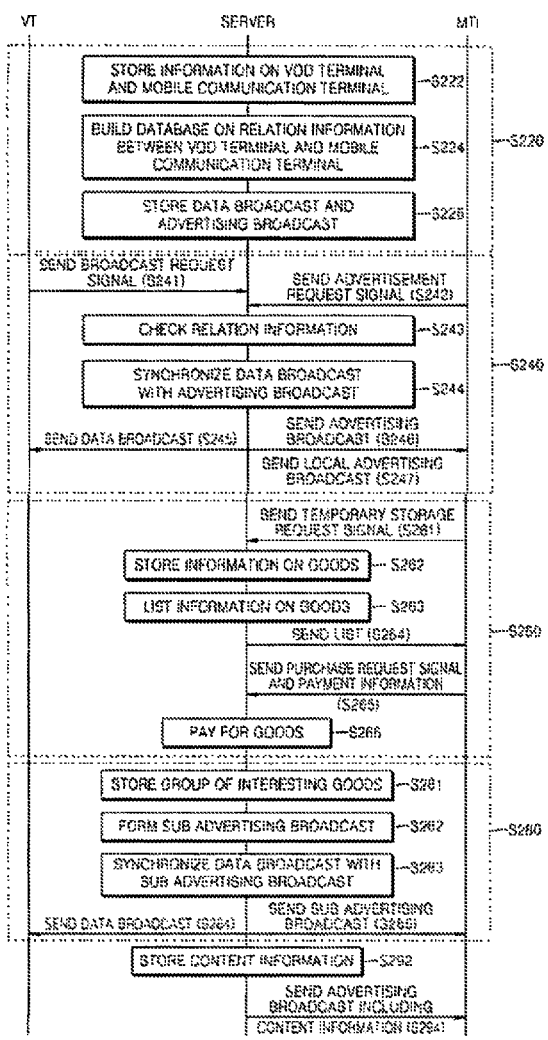

ADVERTISING METHOD AND SYSTEM ADAPTIVE TO DATA BROADCAST

CROSS-REFERENCE TO RELATED APPLICATIONS

This application is a national phase application of PCT Application No. PCT/KR2009/004345 filed on Aug. 4, 2009, which claims the benefit and priority to Korean Patent Application No. 10-2008-0077220 filed Aug. 7, 2008. The entire disclosures of the applications identified in this paragraph are incorporated herein by references.

FIELD

The present invention relates to an advertising method and system, and more particularly, to advertising broadcast adaptive to data broadcast, capable of improving advertising effects and convenience of customers to purchase goods by providing advertising broadcast corresponding to and synchronized with data broadcast replayed by a video on demand (VOD) terminal to a mobile communication terminal corresponding to the VOD terminal, and a system for the same.

BACKGROUND

Recently, goods and places shown in broadcast have attracted attention. Such information has great effects on purchasing goods related to corresponding broadcast. Accordingly, there are required an advertising method and system capable of increasing advertising effects and convenience of purchasing goods by connecting information provided by broadcast to purchase of consumers.

SUMMARY OF THE INVENTION

Technical Object

The present invention provides an advertising method and system capable of connecting information provided via broadcasts to purchases of consumers.

Technical Solution

According to an aspect of the present invention, there is provided an advertising method adaptive to data broadcasts, the method including: receiving a broadcast request signal from a video on demand (VOD) terminal to download data broadcast; receiving an advertisement request signal from a mobile communication terminal to download advertising broadcast including information on goods related to contents of the data broadcast; synchronizing the data broadcast with the advertising broadcast in such a way that an advertising broadcast scene corresponding to the data broadcast is displayed on the mobile communication terminal while replaying the data broadcast on the VOD terminal; sending the data broadcast to the VOD terminal; and sending the advertising broadcast to the mobile communication terminal.

Particularly, the advertisement request signal may be received from a plurality of mobile communication terminals.

Particularly, the advertising broadcast may further include information on the contents of the data broadcast.

Particularly, the method may further include: storing an IP address of the VOD terminal, a geographical address where the VOD terminal is located, and a number of the mobile communication terminal before receiving the advertisement request signal; and storing information on the relation between the VOD terminal and the mobile communication terminal in a database, the information formed by matching the IP address or the geographical address of the VOD terminal with the number of the mobile communication terminal. In this case, the advertising broadcast may be a local advertisement corresponding to the geographical address where the VOD terminal is located.

Particularly, the method may further include: receiving a first purchase request signal and payment information corresponding to goods displayed on the advertising broad scene from the mobile communication terminal; and paying for the goods corresponding to the first purchase request signal by using the payment information. On the other hand, the method may further include: receiving a temporary storage request signal corresponding to goods displayed on the advertising broad scene from the mobile communication terminal and storing information on the goods; and receiving a second purchase request signal and payment information corresponding to a part or all of goods included in the stored information on the goods from the mobile communication terminal and paying for the goods corresponding to the second purchase request signal by using the payment information.

Particularly, the method may further include: listing information on all of goods shown in the advertising broadcast; providing a list of the information on all of goods to the mobile communication terminal; and receiving a third purchase request signal and payment information corresponding to a part or all of the goods included in the list from the mobile communication terminal and paying for the goods corresponding to the third purchase request signal by using the payment information.

Particularly, the method may further include, after the sending the advertising broadcast to the mobile communication terminal: storing information on a group of goods-of-interest in which a user of the mobile communication terminal is interested; generating sub-advertising broadcast by extracting contents corresponding to the group of goods-of-interest from the advertising broadcast; synchronizing the sub-advertising broadcast with the data broadcast; and sending the sub-advertising broadcast to the mobile communication terminal. In this case, information on a plurality of groups of goods-of-interest may be stored with respect to a user of a mobile communication terminal.

Particularly, the method may further include: storing the data broadcast before receiving the broadcast request signal; and storing advertising broadcast previously produced in response to the data broadcast.

According to another aspect of the present invention, there is provided an advertising system adaptive to data broadcast, the system includes: a data broadcast storage and an advertising broadcast storage storing data broadcast and advertising broadcast, respectively; a transceiver receiving a broadcast request signal from a VOD terminal and an advertisement request signal from a mobile communication terminal and sending corresponding data broadcast to the VOD terminal and corresponding advertising broadcast to the mobile communication terminal; and a controller searching the data broadcast corresponding to the broadcast request signal on the data broadcast storage, searching the advertising broadcast corresponding to the advertisement request signal on the advertising broadcast storage, and synchronizing the data broadcast with the advertising broadcast in such a way that an advertising broadcast scene corresponding to a scene of the data broadcast is displayed on the mobile communication terminal while replaying the data broadcast on the VOD terminal.

Particularly, the system may further include a user information storage storing an IP address of the VOD terminal, a geographical address where the VOD terminal is located, and a number of the mobile communication terminal and storing information on the relation between the VOD terminal and the mobile communication terminal, the information formed by matching the IP address or the geographical address of the VOD terminal with the number of the mobile communication terminal.

Particularly, the system may further include a payment unit, when the transceiver receives a first purchase request signal and payment information corresponding to goods displayed on the advertising broadcast scene from the mobile communication terminal, paying for goods corresponding to the first purchase request signal by using the payment information.

Particularly, the system may further include: a goods information storage, when the transceiver receives a temporary storage request signal corresponding to goods displayed on the advertising broadcast scene from the mobile communication terminal, storing information on the goods; and a payment unit, when the transceiver receives a second purchase request signal and payment information corresponding to a part or all of goods included in the stored information on the goods from the mobile communication terminal, paying for the goods corresponding to the second purchase request signal by using the payment information.

Particularly, the system may further include: a goods information storage storing a list of information on all the goods shown in the advertising broadcast; and a payment unit, when the transceiver receives a third purchase request signal and payment information corresponding to a part or all of the goods included in the list from the mobile communication terminal, paying for the goods corresponding to the third purchase request signal by using the payment information.

Particularly, the system may further include an goods-of-interest storage storing information on a group of goods-of-interest of a user of the mobile communication terminal. In this case, the controller forms sub-advertising broadcast by extracting contents corresponding to the group of goods-of-interest from the advertising broadcast, synchronizes the sub-advertising broadcast with the data broadcast, and sends the sub-advertising broadcast to the mobile communication terminal via the transceiver.

Advantageous Effects

The advertising method and system adaptive to data broadcast may allow a user of a mobile communication terminal, that is, a customer to easily acquire information on goods shown in the data broadcast, thereby improving advertising effects. Also, since the advertising broadcast is sent to a mobile communication terminal corresponding to a VOD terminal instead of the VOD terminal, this prevents a flow of broadcast from being cut off by inserting a commercial or advertisements from occupying a part of a scene of the broadcast in such a way that there is no commercial interruption in watching the data broadcast.

In addition, there are provided various convenient ways of payment and advertisements on goods-of-interest of users are intensively exposed, thereby not only improving advertising effects but also providing convenient shopping to customers.

BRIEF DESCRIPTION OF THE DRAWINGS

The above and other features and advantages of the present invention will become more apparent by describing in detail exemplary embodiments thereof with reference to the attached drawings in which:

FIG. 2 is a flowchart illustrating an advertising method according to an embodiment of the present invention.

DETAILED DESCRIPTION OF THE INVENTION

Figure 1:
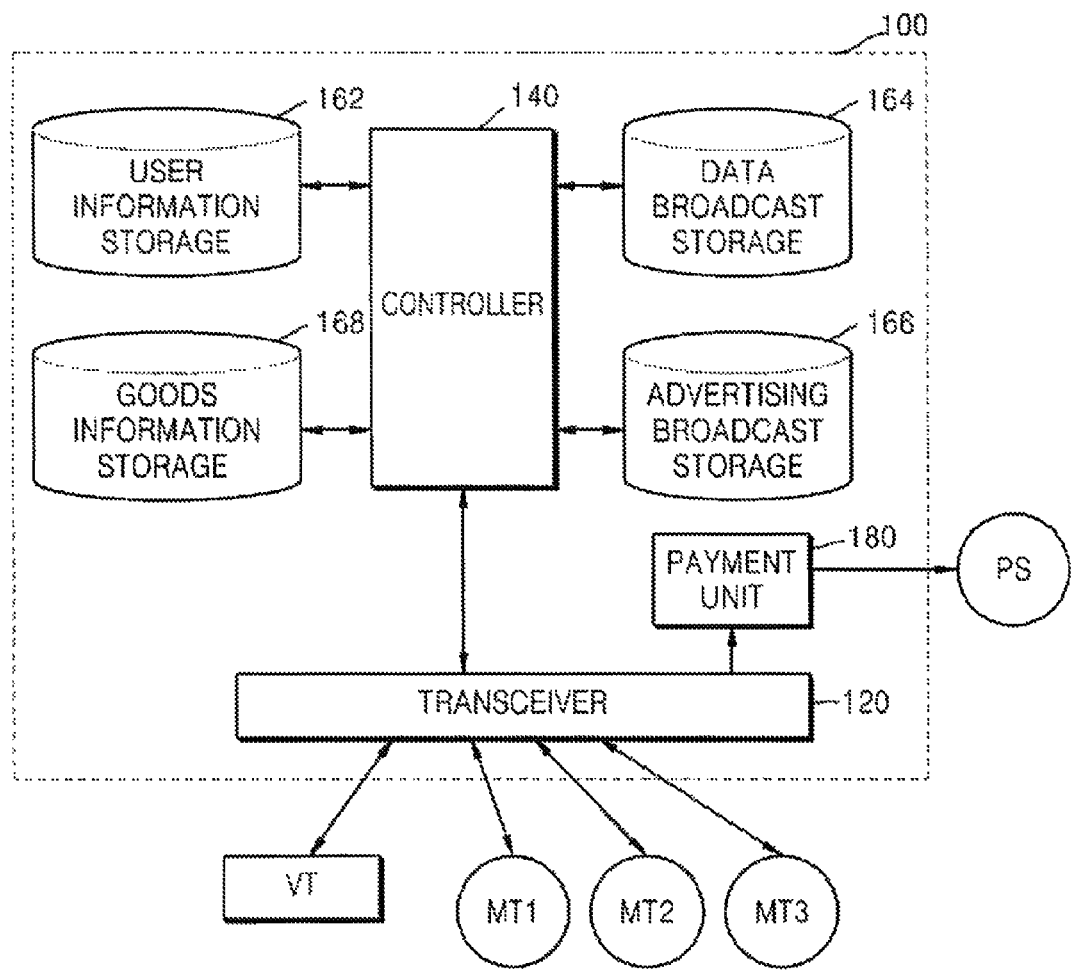
FIG. 1 is a block diagram illustrating an advertising system according to an embodiment of the present invention.

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

FIG. 1 is a block diagram illustrating an advertising server according to an embodiment of the present invention, and FIG. 2 is a flowchart illustrating an advertising method according to an embodiment of the present invention. The method 200 may be performed by the server 100 of FIG. 1. Hereinafter, data broadcast indicates broadcast sent to a viewer according to a request of the viewer whenever the viewer wants. Also, advertising broadcast indicates broadcast including information on goods related to contents of the data broadcast.

In this case, goods advertised in the advertising broadcast are not limited to articles but may include services such as sound sources of background music of data broadcast and tour packages related thereto.

Referring to FIGS. 1 and 2, to provide advertising broadcast adaptive to data broadcast, firstly, the server 100 stores required information and the data broadcast (S220). The server 100 may include a data broadcast storage 164 and an advertising broadcast storage 166 storing data broadcast and advertising broadcast, respectively. In this case, the advertising broadcast may be previously produced corresponding to goods shown in data broadcast and be stored in the advertising broadcast storage 166.

There is stored terminal information on a video on demand (VOD) terminal VT and mobile communication terminals MTi, indicating one or more of MT1, MT2, and MT3 show in FIG. 1, in a user information storage 162 (S222). Particularly, the VOD terminal VT may be a television for displaying data broadcast via IPTV services.

The terminal information may include an IP address of the VOD terminal VT, a geographical address where the VOD terminal VT is located, and the number of the mobile communication terminal MTi. In this case, there may be stored relation information between the VOD terminal VT and the mobile communication terminal MTi in the user information storage 162 (S224). In this case, the relation information indicates the relation between one of the IP address and the geographical address of the VOD terminal and the number of the mobile communication terminal MTi.

Like this, by matching a VOD terminal with a mobile communication terminal, it is possible to send advertising broadcast corresponding to data broadcast replayed on the VOD terminal.

In this case, as shown in FIG. 1, several mobile communication terminals MTi may correspond to one VOD terminal VT. For example, mobile communication terminals of respective members of A family such as father, mother, and children may be registered as mobile communication terminals corresponding to an IP address or a geographical address of an IPTV of the A family, in which the geographical address may indicate an address of a house where the IPTV is installed.

Also, using such relation information, local advertising broadcast corresponding to an area may be sent to mobile communication terminals corresponding to a geographical address of a VOD terminal (S247). For example, when a geographical address of the VOD terminal VT is Y-Z, X apartment in "Seoul", it is possible to send local advertising information related to "Seoul" area, such as an advertisement for tableware sets on sail in a department store located in "Seoul", to the VOD terminal VT and the mobile communication terminal MTi corresponding thereto by referring to the user information storage 162. In this case, local advertising broadcast may be manufactured separately from the advertising broadcast or be manufactured by extracting contents related to a corresponding area from the advertising broadcast.

Referring to FIGS. 1 and 2, the server 100 sends broadcasts to respective terminals according to the request thereof (S240). In detail, a transceiver 120 receives a broadcast request signal from the VOD terminal VT (S241), receives an advertisement request signal from the mobile communication terminal MTi (S242), and transmits the same to a controller 140. Though there is shown that the broadcast request signal is received prior to the advertisement request signal in FIG. 2, it is not limited thereto but the advertisement request signal may be previously received than the broadcast request signal or the two signals may be received at the same time.

Particularly, the VOD terminal VT may send a broadcast request signal to the server 100 via Internet and mobile communication terminal MTi may send an advertisement request signal via a mobile communication network.

The controller 140 of the server 100 receiving the broadcast request signal and advertisement request signal may check relation information between the VOD terminal VT and mobile communication terminal MTi, sending the respective signals, from the user information storage 162 (S243). When the relation information between both of them is checked, the advertising broadcast is synchronized with the data broadcast to be sent (S244). To display a scene of the advertising broadcast, corresponding to a scene of the data broadcast on the mobile communication terminal MTi in real time, such synchronization may be necessary.

The transceiver 120 of the server 100 sends the synchronized data broadcast and advertising broadcast to the VOD terminal VT and the mobile communication terminal MTi, respectively (S245, S246). As described above, according to the advertising broadcast and system according to an embodiment of the present invention, a user of a mobile communication terminal may easily acquire information on goods shown in data broadcast, thereby improving advertising effects. Also, since advertising broadcast is sent to a mobile communication terminal related to a VOD terminal instead of the VOD terminal, it is possible to prevent cutting off a flow of the data broadcast by inserting a commercial or an occupation of an advertisement on a part of a scene of the data broadcast.

Referring to FIGS. 1 and 2, when the user of the mobile communication terminal MTi, receiving the advertising broadcast, desires to purchase goods shown in the advertising broadcast, the server 100 may provide payment services with respect to the corresponding goods (S260). Hereinafter, there will be described a method of purchasing goods and paying for the same according to an embodiment of the present invention.

When the user of the mobile communication terminal MTi desires to purchase goods shown in a scene of the advertising broadcast replayed by the mobile communication terminal MTi, a purchase request signal and payment information with respect to corresponding goods may be sent to the server 100 by using the mobile communication terminal MTi (S265). A payment unit 180 of the server 100 may pay for goods corresponding to the purchase request signal by using the payment information (S266). In this case, the payment unit 180 may use an external payment system PS. Since a payment method of the advertising method and system according to the present embodiment is the same as general mobile payment methods, a detailed description thereof will be omitted.

As described above, goods displayed on the mobile communication terminal MTi may be purchased directly. However, the user of the mobile communication terminal MTi may store information on the goods, presently displayed, in the server 100 temporarily and decide whether to purchase the same later. In this case, the mobile communication terminal MTi may send a temporary storage request signal with respect to corresponding goods to the server 100 (S261). The controller 140 may response to the temporary storage request signal received via the transceiver 120 and store information on the corresponding goods in a goods information storage 168 (S262). The stored information may be sent to the mobile communication terminal MTi according to a request of the user of the mobile communication terminal MTi or be provided via Internet.

Also, the server 100 may list and store information on all the goods shown in the advertising broadcast in the goods information storage 168 (S263) and send a goods information list to the mobile communication terminal MTi (S264). In FIG. 2, there is shown that the goods information list is sent to the mobile communication terminal MTi. However, it is not limited thereto but the user of the mobile communication terminal MTi may search a corresponding list via Internet.

A way of purchasing goods stored in the goods information storage 168 or goods included in the list is the same as described above. That is, the transceiver 120 receives a purchase request signal and payment information with respect to one or more of goods stored in the goods information storage 168 and goods included in the list from the mobile communication terminal MTi (S265) and the payment unit 180 may pay for goods corresponding to the purchase request signal by using payment information (S266).

Heretofore, there has been described the way of purchasing and paying for goods according to the advertising method and system according to an embodiment of the present invention. Next, it will be described a way of providing only contents of a group of goods included in a category from among the advertising broadcast, designated by the user of the mobile communication terminal MTi, in the advertising method and system (S280).

Referring to FIGS. 1 and 2, the server 100 may store information on a group of goods-of-interest of the user of the mobile communication terminal MTi in a goods information storage 168 (S281) In this case, the user of the mobile communication terminal MTi may store information on a plurality of groups of goods-of-interest in the server. For example, with respect to a user U, female fashion items such as clothes, bags, shoes, and accessories and interior items may be stored as groups of goods-of-interest.

The controller 140 of the server 100 may form sub-advertising broadcast by extracting contents of a group of goods-of-interest registered with respect to the user from among the advertising broadcast (S282). Similar to the advertising broadcast, the sub-advertising broadcast may be synchronized with the data broadcast (S283) and be sent to a mobile communication terminal MTi of a corresponding user (S285) when the data broadcast is sent to the VOD terminal VT (S284). In this case, similar to the advertising broadcast, the sub-advertising broadcast may be stored in the advertising broadcast storage 166.

As described above, the advertising method and system according to the present embodiment may improve advertising effects by intensively advertising goods-of-interest of customers.

Referring to FIGS. 1 and 2, in addition to advertisements for goods, the advertising broadcast of the present embodiment may further include content information such as famous restaurants, places, cooking recipes, and health information, related to contents of the data broadcast (S294). For this, the server 100 may store the content information in one of additional storage and the goods information storage 168 (S292).

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The advertising method and system according to the present embodiment may be applied to the field of broadcast systems using Internet.

What is claimed is:

1. An advertising method adaptive to data broadcasts, the method comprising:
   receiving a broadcast request signal from a video on demand (VOD) terminal to download data broadcast;
   receiving an advertisement request signal from a mobile communication terminal to download advertising broadcast comprising information on goods related to contents of the data broadcast;
   storing an IP address of the VOD terminal, a geographical address where the VOD terminal is located, and a number of the mobile communication terminal before receiving the advertisement request signal;
   storing information on a relation between the VOD terminal and the mobile communication terminal in a database, the information formed by matching one of the IP address and the geographical address of the VOD terminal with the number of the mobile communication terminal;
   synchronizing the data broadcast with the advertising broadcast in such a way that an advertising broadcast scene corresponding to the data broadcast is displayed on the mobile communication terminal while replaying the data broadcast on the VOD terminal;
   sending the data broadcast to the VOD terminal;
   sending the advertising broadcast to the mobile communication terminal;
   storing information on a group of goods-of-interest in which a user of the mobile communication terminal is interested;
   generating sub-advertising broadcast by extracting contents corresponding to the group of goods-of-interest from the advertising broadcast;
   synchronizing the sub-advertising broadcast with the data broadcast; and
   sending the sub-advertising broadcast to the mobile communication terminal.

2. The method of claim 1, wherein the advertisement request signal is received from a plurality of mobile communication terminals.

3. The method of claim 1, wherein the advertising broadcast further comprises information on the contents of the data broadcast.

4. The method of claim 1, wherein the advertising broadcast is a local advertisement corresponding to the geographical address where the VOD terminal is located.

5. The method of claim 1, further comprising:
   receiving a first purchase request signal and payment information corresponding to goods displayed on the advertising broadcast scene from the mobile communication terminal; and
   paying for the goods corresponding to the first purchase request signal by using the payment information.

6. The method of claim 1, further comprising:
   receiving a temporary storage request signal corresponding to goods displayed on the advertising broadcast scene from the mobile communication terminal and storing information on the goods; and
   receiving a second purchase request signal and payment information corresponding to a part or all of goods included in the stored information on the goods from the mobile communication terminal and paying for the goods corresponding to the second purchase request signal by using the payment information.

7. The method of claim 1, further comprising:
   listing information on all of goods shown in the advertising broadcast;
   providing a list of the information on all of goods to the mobile communication terminal; and
   receiving a third purchase request signal and payment information corresponding to a part or all of the goods included in the list from the mobile communication terminal and paying for the goods corresponding to the third purchase request signal by using the payment information.

8. The method of claim 1, wherein, in the storing information on a group of goods-of-interest in which a user of the mobile communication terminal is interested, information on a plurality of groups of goods-of-interest is stored with respect to a user of a mobile communication terminal.

9. The method of claim 1, further comprising:
   storing the data broadcast before receiving the broadcast request signal; and
   storing advertising broadcast previously produced in response to the data broadcast.

10. An advertising system adaptive to data broadcast, the system comprising:
    a data broadcast storage and an advertising broadcast storage storing data broadcast and advertising broadcast, respectively;
    a transceiver receiving a broadcast request signal from a VOD terminal and an advertisement request signal from a mobile communication terminal and sending corresponding data broadcast to the VOD terminal and corresponding advertising broadcast to the mobile communication terminal;
    a controller searching the data broadcast corresponding to the broadcast request signal on the data broadcast storage, searching the advertising broadcast corresponding to the advertisement request signal on the advertising broadcast storage, and synchronizing the data broadcast with the advertising broadcast in such a way that an advertising broadcast scene corresponding to a scene of the data broadcast is displayed on the mobile communication terminal while replaying the data broadcast on the VOD terminal, a user information storage storing an IP address of the VOD terminal, a geographical address where the VOD terminal is located, and a number of the mobile communication terminal and storing information on the relation between the VOD terminal and the mobile communication terminal, the information formed by matching one of the IP address and the geographical address of the VOD terminal with the number of the mobile communication terminal, and a goods information storage, when the transceiver receives a temporary storage request signal corresponding to goods displayed on the advertising broadcast scene from the mobile communication terminal, storing information on the goods and a list of information on all of goods shown in the advertising broadcast.

11. The system of claim 10, further comprising a payment unit, when the transceiver receives a first purchase request signal and payment information corresponding to goods displayed on the advertising broadcast scene from the mobile communication terminal, pays for goods corresponding to the first purchase request signal by using the payment information.

12. The system of claim 10, further comprising
a payment unit, when the transceiver receives a second purchase request signal and payment information corresponding to a part or all of goods included in the stored information on the goods from the mobile communication terminal, pays for the goods corresponding to the second purchase request signal by using the payment information.

13. The system of claim 10, further comprising
a payment unit, when the transceiver receives a third purchase request signal and payment information corresponding to a part or all of the goods included in the list from the mobile communication terminal, pays for the goods corresponding to the third purchase request signal by using the payment information.

14. The system of claim 10, further comprising a goods-of-interest storage storing information on a group of goods-of-interest of a user of the mobile communication terminal,
wherein the controller forms sub-advertising broadcast by extracting contents corresponding to the group of goods-of-interest from the advertising broadcast, synchronizes the sub-advertising broadcast with the data broadcast, and sends the sub-advertising broadcast to the mobile communication terminal via the transceiver.

* * * * *

UNITED STATES PATENT AND TRADEMARK OFFICE
CERTIFICATE OF CORRECTION

PATENT NO. : 8,666,814 B2  
APPLICATION NO. : 13/057554  
DATED : March 4, 2014  
INVENTOR(S) : Jong Ok Ko Page 1 of 1

It is certified that error appears in the above-identified patent and that said Letters Patent is hereby corrected as shown below:

On the title page, item (73), replace Assignee: "Fobikr Co., Ltd., Incheon (KR)" with "E4NET CO., LTD., Seoul (KR)".

Signed and Sealed this  
Twenty-second Day of July, 2014

Michelle K. Lee  
*Deputy Director of the United States Patent and Trademark Office*